Nov. 27, 1956  A. W. BEATTY  2,771,665
FABRICATION OF BRANCHED FITTINGS
Filed April 28, 1952  2 Sheets-Sheet 1
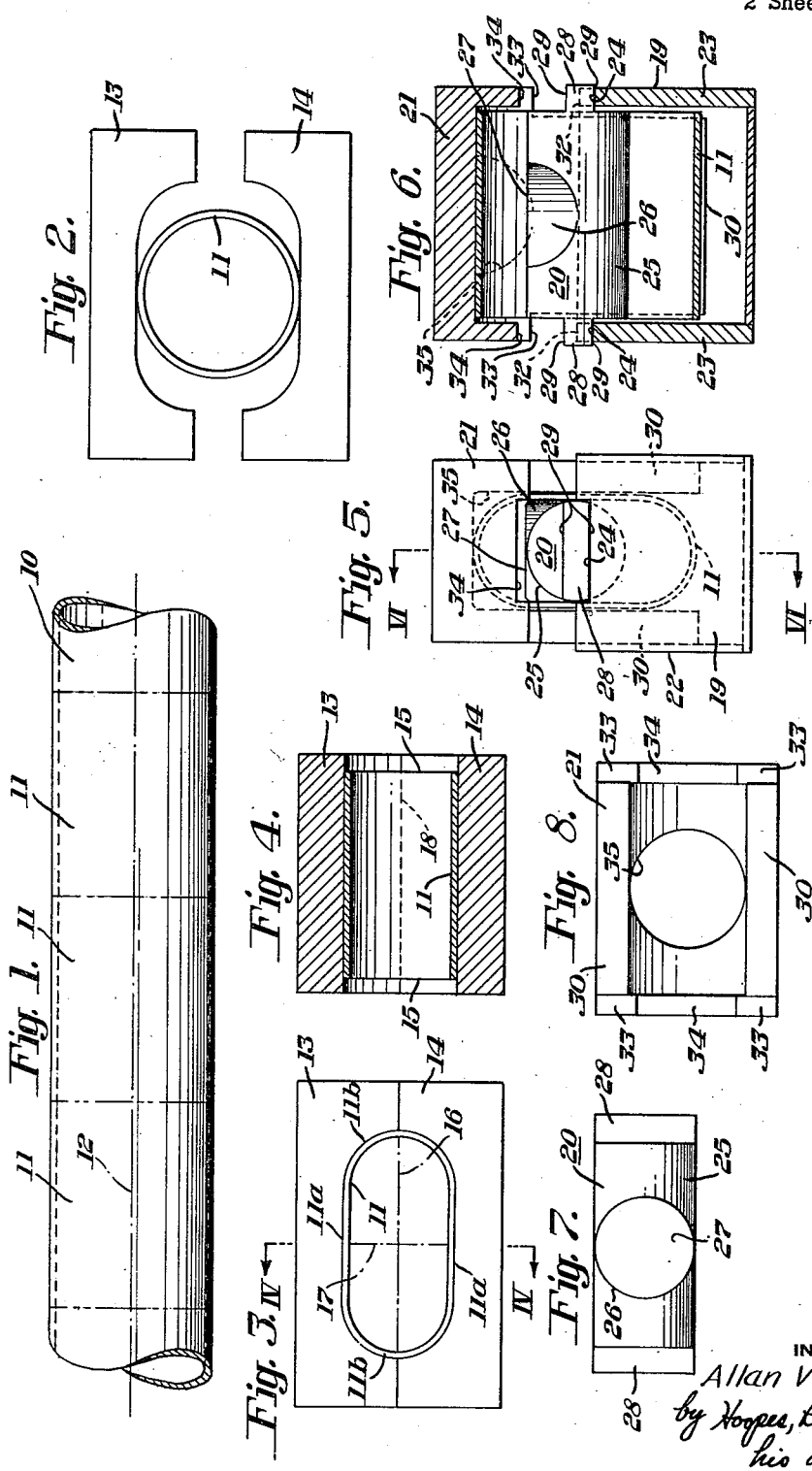
INVENTOR
Allan W. Beatty
by Hoopes, Leonard & Glenn
his attorneys

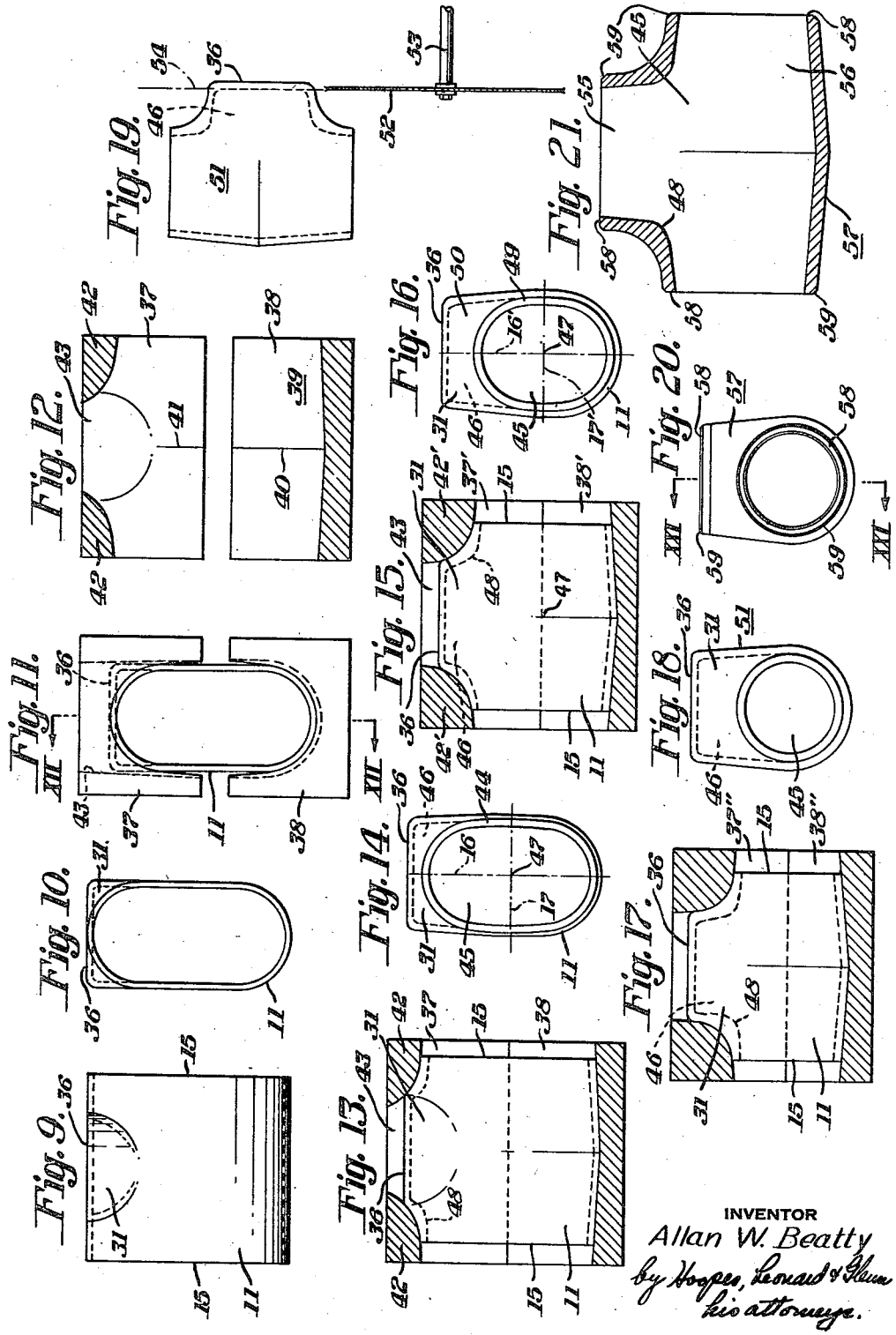

United States Patent Office 2,771,665
Patented Nov. 27, 1956

2,771,665

FABRICATION OF BRANCHED FITTINGS

Allan W. Beatty, Franklin Township, Allegheny County, Pa., assignor to Welding Fittings Corporation, New Castle, Pa., a corporation of Pennsylvania Application April 28, 1952, Serial No. 284,805

1 Claim. (Cl. 29—157)

This invention relates to the manufacture of branched fittings. More particularly, it pertains to the manufacture of such fittings from tubular material by means of a new series of shaping and reducing operations thereon.

In the formation of branched fittings such as T fittings made from pipe stock, it was a common practice to pierce the side of the pipe stock. After making such an opening, internal expanding dies were pulled through the opening from the inside to the outside to form the branch. Such internal work was performed in cooperation with other dies applied to the outside of the stock. In addition, in some cases differential heating of the member being formed was employed. One type of such operations is shown, for example, in United States Patent No. 2,290,965, issued July 28, 1942.

In the prior practice of such a character, a number of disadvantages are present. Thus, the piercing and expanding of the opening and surrounding metal of the pipe stock to form the branch are relatively critical operations. Improper alignment of the expanding die with the axis of the branch might produce an uneven wall thickness in the branch causing the rejection of the fitting. Similarly, the use on a repeated basis of internal expanding die assemblies involved considerable and troublesome handling and equipment. Thus, in such prior practice, it was frequently necessary to provide a double action press so that simultaneous pulling and pushing forces could be exerted on the workpiece. Whenever differential heating might be employed, the problem arose as to the control of the differential and the amount of subsequent work to be applied to the respective differentially heated portions of the fitting being made.

In the present invention, the foregoing disadvantages are overcome. Instead, a branched fitting such as a T can be produced from seamless or welded tubular material with a minimum of equipment and a minimum of handling. Further, such handling can be performed by relatively unskilled operators. Since no piercing or opening is made in the side of the tubular material under this invention, the problems attendant thereupon in prior practices are consequently avoided. In fact, substantially all of the work performed in accordance with this new method is performed on the exterior of the tubular material, yet the branched fitting finally obtained is correctly sized and dimensioned and is provided with walls of the desired thickness throughout. The character of the work to be done in fabricating a branched fitting under this invention, moreover, requires only a single action press to effect compressive or pushing forces. Where heating is used between operations under this invention, such heating may be a uniform heating of the entire article undergoing manufacture.

Other objects and advantages of this invention will be apparent from the following description and from the drawings which are schematic only, in which, Figure 1 is a view of a section of tubular material from which desired lengths may be taken for the fabrication of branched fittings in accordance with this invention;

Figure 2 is an end view of such a length about to be pressed into oval form;

Figure 3 is an end view at the completion of the pressing of the length of tubular material shown in Figure 2;

Figure 4 is a view in cross section taken along line IV—IV of Figure 3;

Figure 5 is an end view of the oval length of tubular material shown in Figures 3 and 4 ready for the landing operation;

Figure 6 is a view in cross section taken along line VI—VI of Figure 5;

Figure 7 is a plan view of a form of mandrel utilized in the fabrication step shown in Figures 5 and 6;

Figure 8 is a plan view of the underside of the top die shown in Figures 5 and 6, which die cooperates with the aforesaid mandrel;

Figure 9 is a view in side elevation of the oval length shown in Figures 5 and 6 after an imperforate land has been formed therein;

Figure 10 is an end view of the length shown in Figure 9;

Figure 11 is an end view of the oval length of tubular material shown in Figure 10 positioned in a pair of dies for a reducing operation;

Figure 12 is a view in cross section taken along line XII—XII of Figure 11 through the dies thereof only;

Figure 13 is a view in cross section similar to the view shown in Figure 12 after the initial reducing operation has been completed on the oval length with its imperforate land which is shown in Figure 11;

Figure 14 is an end view of the length of tubular material after the reduction effected as shown in Figure 13;

Figures 15 and 16 illustrate the effects of an intermediate reduction on the tubular material following the reduction shown in Figures 13 and 14;

Figures 17 and 18 are views illustrating a final reduction on the tubular material following the reduction shown in Figures 15 and 16;

Figure 19 is a view of the length of reduced tubular material shown in Figure 18 in position to have the top of the land removed therefrom to open a branch outlet through said land in communication with the opening extending through the length or run of the reduced tubular material in alignment with the run axis thereof, and thereby complete a branched fitting such as a T;

Figure 20 is an end view of the T fitting shown in Figure 19 with the faces, bore and bevels machined to finish the same; and Figure 21 is an enlarged view in cross section of the T fitting shown in Figure 20 taken along line XXI—XXI thereof.

Referring to the drawings, a section 10 of tubular material such as stainless steel pipe is selected having an appropriate wall thickness and inside diameter. Such tubular material may be seamless where the branched fitting to be fabricated is similarly seamless, or it may be welded pipe. Similarly, other ferrous metals or other metals than stainless steel may be employed in carrying out the invention.

The section 10 may be sawed or otherwise divided into lengths 11 respectively between the dot-and-dash line shown in Figure 1 having an appropriate length or axial dimension parallel to the axis 12 of the section 10 sufficient to complete the branched fittings, such as T's, to be made from each of the lengths 11 of the tubular material. In the forming of such a T from a length 11, the length is placed between upper and lower dies 13 and 14 respectively. By pressing the dies 13 and 14 together as shown in Figures 3 and 4, if the length 11 be circular in cross section, it will be flattened to an oval shape having relatively flat sides 11a and semi-circular or rounded ends 11b. It will be noted that there is no axial confinement or restriction of the edges 15 by the dies 13 and 14 at the respective ends of the length 11.

While the length 11 in the form shown after the operation illustrated in Figures 3 and 4 has a shape which may be generally termed oval in cross section, other cross sectional elongation operations may be substituted. In such, the transverse axis 16 will be greater than the transverse axis 17, respectively, in the horizontal and vertical positions as shown in Fig. 3 for the length 11. The longitudinal axis 18 is shown in Figure 4 and passes through and is normal to the intersection of the transverse axes 16 and 17.

In the operation illustrated in Figures 3 and 4, there is generally no change in the wall thickness dimension of the length 11, nor for that matter in the length between the ends 15. Whenever branched fittings made by this invention with thicker walls are required, the original selection of a section of material such as section 10 will generally be of heavier wall thickness; although as will be described later, the control of the wall thickness is also a function of the process steps disclosed herein. Any suitable press, such as a single-action commercial hydraulic press, may be utilized to bring the dies 13 and 14 together to perform the operation illustrated in Figures 3 and 4.

A further operation in the practice of this invention is illustrated in Figures 5 to 10 inclusive. In this further step a mandrel support 19 is provided for a mandrel 20. The support 19 may also act as a guide for a die 21 which cooperates with the mandrel 20 in forming an imperforate land in one of the round sides 11b of the length 11. The support 19 may be in the form of a box having no top but having sides 22 and front and back walls 23. Notches 24 may be provided in the top edges of the front and back walls 23 in alignment and are adapted to position mandrel 20. Mandrel 20 may be provided with a body 25 in the form of a right circular cylinder. Intermediate the ends of the body 25 there is an integral boss 26, the top surface 27 of which is circular and substantially in the plane of the element of body 25 to which it is tangent. The diameter of the boss 26 may be substantially the diameter of the body 25. The sides of the boss 26 may extend generally vertically downwardly and merge into the surface of body 25 at the intersection of the respective surfaces.

Positioning guides 28 extend outwardly from each end of the body 25 of mandrel 20 and are provided with upper and lower surfaces 29 normal to the axis of boss 26. The lower surface 29 rests on the bottom of the respective notches 24 when the mandrel is assembled with support 19. In such assembling, boss 26 is kept in an upward position. Before such assembling, the length 11 following the operation shown in Figures 3 and 4 is inserted over the body of the mandrel 25 with the axis of boss 26 extending parallel, and in the illustrated embodiment, coinciding with the greater transverse axis 16. The length of body 25 and the distance between the insides of the walls 23 is slightly greater than the distance between the ends 15 of the length 11 in its oval shape.

The die 21 has a generally inverted U-shape in cross section, the lateral downwardly extending sides 30 being adapted to slide along the inside of the sides 22 of support 19 and on the other side thereof along the flattened sides 11a of the length 11 in its oval form. Appropriate clearances are provided without interfering with the cooperation of the mandrel 20 and die 21 in forming an imperforate land 31 on length 11 as shown in Figures 9 and 10 after die 21 and support 19 have been brought together until the edges 32 and 33, respectively on the support 19 and die 21, meet. Aligned notches 34 on the ends of die 21 fit around and accommodate the lugs 28 as the support 19 and mandrel 20 on the one hand and the die 21 on the other hand, are brought together, after being assembled with the length 11 in the position shown in Figures 5 and 6.

The underside of die 21 is provided with a mating recess 35 corresponding in an intaglio fashion with the relief of boss 26, there being sufficient space between the two when the die 21 is down hard to accommodate the metal thickness in the imperforate land 31, which thickness on the sides thereof may be slightly thinned in this step but is later thickened by upsetting as the branch end 46 is further fabricated in subsequent steps of this new process.

After the formation of land 31 the top surface 36 of which has no perforations therein, die 21 is removed from support 19 and then the mandrel and length 11 in the shape having the land 31 therein as shown in Figures 9 and 10, are removed from support 19. The removal of mandrel 20 from length 11 with the land 31 therein is readily performed in a vise or by other suitable means. Length 11 following such step has again not changed materially in the distance between its ends or in its wall thickness. It should be noted that the step involving the use of mandrel 20 substantially constitutes the only internal work performed on a length 11 of tubular material cut from pipe 10. Such internal work by the use of mandrel 20 is so readily performed that it in no way hinders the control of the fabrication operation as a whole or complicates it in terms of labor handling or equipment requirements.

Following the step for the initial formation of the land 31 on the length 11, a series of reducing steps are performed. Thus, Figures 11 to 14 illustrate a first of such reducing steps; Figures 15 and 16 illustrate a second of such reducing steps and Figures 17 and 18 illustrate a third reducing step, by way of example, in producing the final dimensions in the branched fitting being fabricated.

Thus, in a first reducing step, an upper die 37 and a lower die 38 may be employed. Inasmuch as a draft or taper from the center outwardly is desirable in many types of branched fittings, the dies 37 and 38 may include some draft. Thus, in lower die 38 the die surface 39 tapers inwardly from the median line 40 thereof to the outer ends of the die. Similarly, in upper die 37, the sides thereof taper inwardly from the median line 41 to the ends and the bridging pieces 42 across the top of the die integral with the sides around opening 43 are similarly tapered inwardly in the direction of the respective axes of the run and branch of the fitting blank to be compressed in dies 37—38, when viewed along such axes outwardly from the center of such fitting.

In effecting reduction by the dies 37 and 38, the length 11 with the land 31 thereon is positioned between the dies as shown in Figure 11, the land 31 itself fitting into the opening 43 through the top of the upper die 37. As shown in Figures 11, 12 and 13, the inner walls of the opening 43 are flush the inner walls of the sides of upper die 37 which in turn are continuous with the inner walls of lower die 38. Hence, bringing dies 37 and 38 together as shown in Figure 13 will effect a reduction or metal thickening of the fitting blank as shown in Figure 14 with an increase in the height of land 31. This reduction is, for the most part, accomplished in the greater transverse dimension along axis 16 and in the lesser transverse dimension along axis 17. In so doing, the wall thickness 44 increases. The opening 45 which is continuous through the length 11 along the axis 18 is commonly termed the "run" of the fitting. The land 31 on the other hand will become a so-called "branch" 46 of the fitting.

In the reduction effected as illustrated in Figures 13 and 14 by bringing the dies 37 and 38 together, while the greater transverse dimension 16 is shortened from the greater transverse dimension existing, for example, in the shape of Figure 10, the distance between top 36 and the center 47 of the fitting being fabricated, remains substantially unchanged. Moreover, in the reduction operation, metal moves, by plastic flow it would appear, into the crotch 48 around the base of the land 31 now assuming the outline of the branch 46. The length of the run 45 between the ends 15 shrinks slightly in the reduction of Figures 13 and 14 but again it should be noted that there is no restriction by the dies 37 and 38 in relation to any movement of such ends in the course of such reduction.

In the subsequent reduction shown in Figures 15 and 16, the dies 37' and 38' act in a similar manner to the dies 37 and 38 but because of their proportions, they effect an intermediate reduced shape as shown in Figure 16. In the shape of Figure 16 the distance again from top 36 to the center 47 appears to remain substantially unchanged as does the measurement of length 11 between the ends 15. However, the greater transverse dimension 16' and the lesser transverse dimension 17' are somewhat less than the corresponding dimensions 16 and 17 of the shape illustrated in Figure 14. The thickness of wall 49 of the shape now taken by length 11 as shown in Figure 16 is greater than the thickness of the same wall illustrated by the reference numeral 44 in Figure 14. In addition, the sides 50 of the branch 46 are higher. These longer sides 50 of land 31 result from the reducing action of the dies 37' and 38' with the tapered bridging pieces 42' therein. In general, the dimensions of opening 43', as in the case of opening 43, in the dies used in the reducing steps may be such that there is no marked reduction made in the diameter of the land 31 which becomes the branch 46. However, such openings may be used to size the branch or to reduce it in diameter if desired. Such a reduction in diameter would at least tend to produce some increase in wall thickness. The top die openings, such as opening 43', also apply the appropriate draft to the exterior of the branch 46.

In a final reducing step such as that illustrated in Figures 17 and 18, similar dies 37" and 38" provide, when brought together by a suitable press, for example, a shape having the final dimensions, wall thickness and draft of the branched fitting to be completed therefrom. Throughout these operations, the top 36 of the land 31 converted into branch 46 remains imperforate and practically all of the work done after forming the land 31 as shown in Figure 10 is work done on the exterior of the length 11.

In completing a T fitting made in accordance with this invention, the top 36 of the branch 46 of shape 51 is cut off. Thus, as illustrated in Figure 19, the final blank shape 51 may be held by any suitable means (not shown) with the top 36 in the plane of a rotary saw 52 mounted on a shaft 53 which is turned by any conventional means. If the saw 52 is on a reciprocating carriage so that it travels in the plane of the inside surface of top 36, reciprocation of the saw will cut off top 36 along the line 54, thereby opening the branch outlet 55 which is in direct communication with the opening 56 extending through the run 45 of the fitting. Thereafter, the completed fitting 57 may be finished by machining the faces 58 and the bevels 59 in addition to whatever machining, if any, is desired in the bore through run opening 56 or the branch outlet 55.

Although the foregoing embodiment of this invention has been illustrated in connection with the fabrication of a T fitting of a seamless type adapted to be welded in place, it is equally adaptable to the fabrication of articles to be finished as threaded and screwed fittings as will be understood by those skilled in the art to whom this disclosure is made. Moreover, it may equally well be applied to T fittings which are reducing in the run or in the branch as well as to other types of branched fittings in which the distances from center to face are unequal. In the case of a T fitting reducing on the run, an additional reducing step might be required on the smaller run end to effect the final dimension desired at that run end. In addition, by modification of the dies illustrated, as will be well understood, branched fittings such as crosses, may also be made pursuant to this invention.

In the making of branched fittings by this invention, it will be well understood that less ductile materials may require heating between the respective fabrication steps. Such heating can be relatively uniform in that the entire fitting blank may be heated. On the other hand, with other materials, the entire operation can be done by cold work alone. Further, under some circumstances, suitable die lubricants of a conventional nature may be employed in the course of practicing this invention.

Various other modifications may be made in features of this invention without departing from the spirit thereof or the scope of the appended claim.

I claim:

In a method of fabricating a branched fitting from a length of metal tubing or pipe stock provided with a generally oval cross section, the steps comprising, in combination, pressing said tubing intermediate its ends in alignment with the major transverse axis of said oval cross section between a die outside said tubing and a die mandrel having a boss thereon inside said tubing to cause said boss to form a land in said tubing at right angles to the axis thereof, said mandrel having a cross-sectional area substantially smaller even after said pressing than the internal cross-sectional area of said tubing, withdrawing said mandrel, thereafter simultaneously compressing said tubing in the same direction as that of said pressing, said compressing being performed substantially only by dies in external contact with substantially the entire transverse external surface of said tubing, said compressing further being substantially transverse to the axis of said tubing to reduce the diameter through said axis of said tubing and to increase the height of said land, the end edges of said tubing and the outermost end of said land being free of axial abutment by said dies during said compressing, repeating such compressing with relatively smaller external dies and no internal dies until relatively circular, cross-sectioned finish dimensions of said tube and closed end land are obtained, and then removing the outermost end of said land to provide an open branch in said fitting.

References Cited in the file of this patent

UNITED STATES PATENTS

| | | |
|---|---|---|
| 653,279 | Barthels | July 10, 1900 |
| 1,921,584 | Robinson | Aug. 8, 1933 |
| 2,206,741 | Cornell | July 2, 1940 |
| 2,290,965 | Hodapp | July 28, 1942 |
| 2,480,011 | Freter | Aug. 23, 1949 |
| 2,670,224 | Markl | Feb. 23, 1954 |